Dec. 9, 1947.                G. I. BILYEU                2,432,082
              BOURDON TUBE VARIABLE RESISTANCE VALVE
                 Filed Oct. 20, 1944        3 Sheets-Sheet 1

INVENTOR
Gerald I. Bilyeu
BY
Blair, Curtis + Hayward
ATTORNEYS

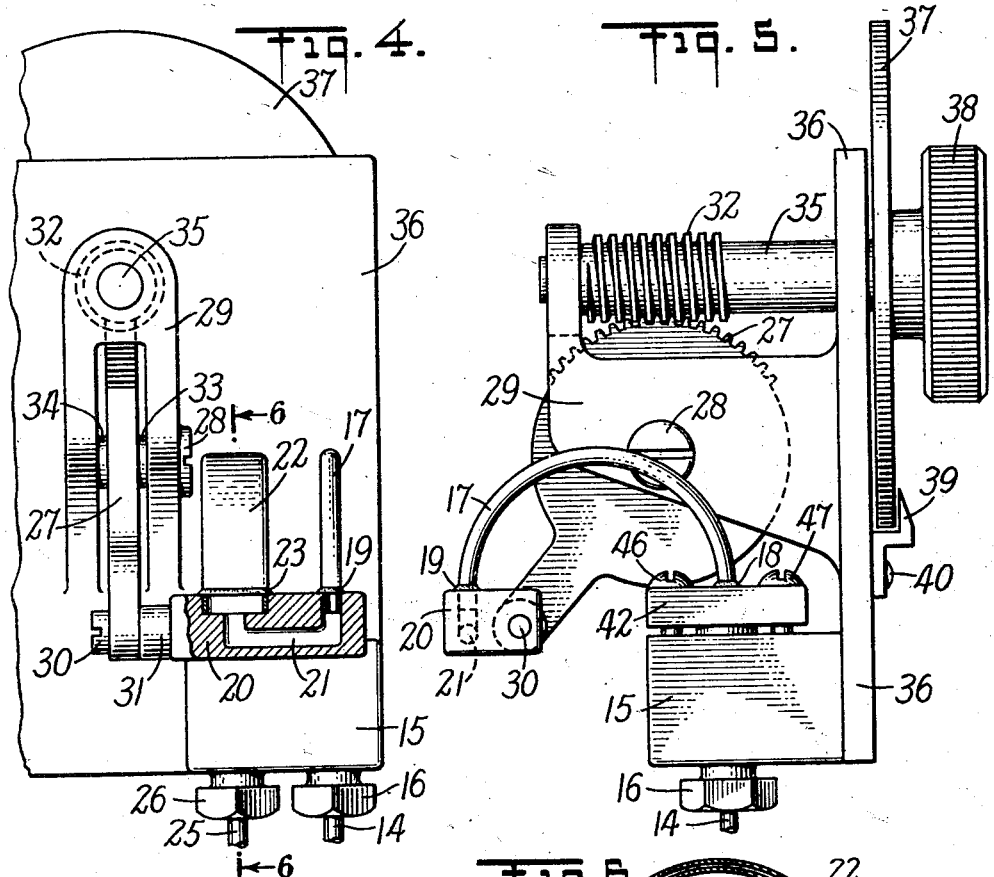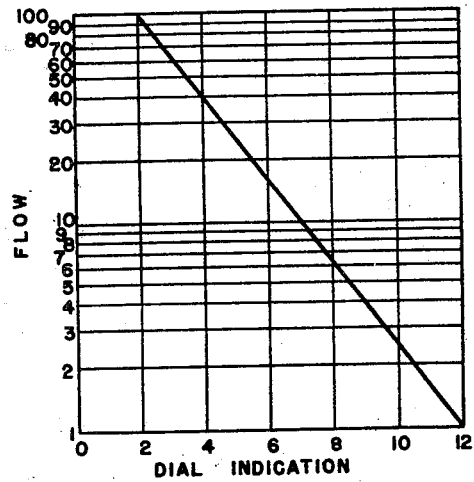

Dec. 9, 1947.   G. I. BILYEU   2,432,082
BOURDON TUBE VARIABLE RESISTANCE VALVE
Filed Oct. 20, 1944   3 Sheets-Sheet 3
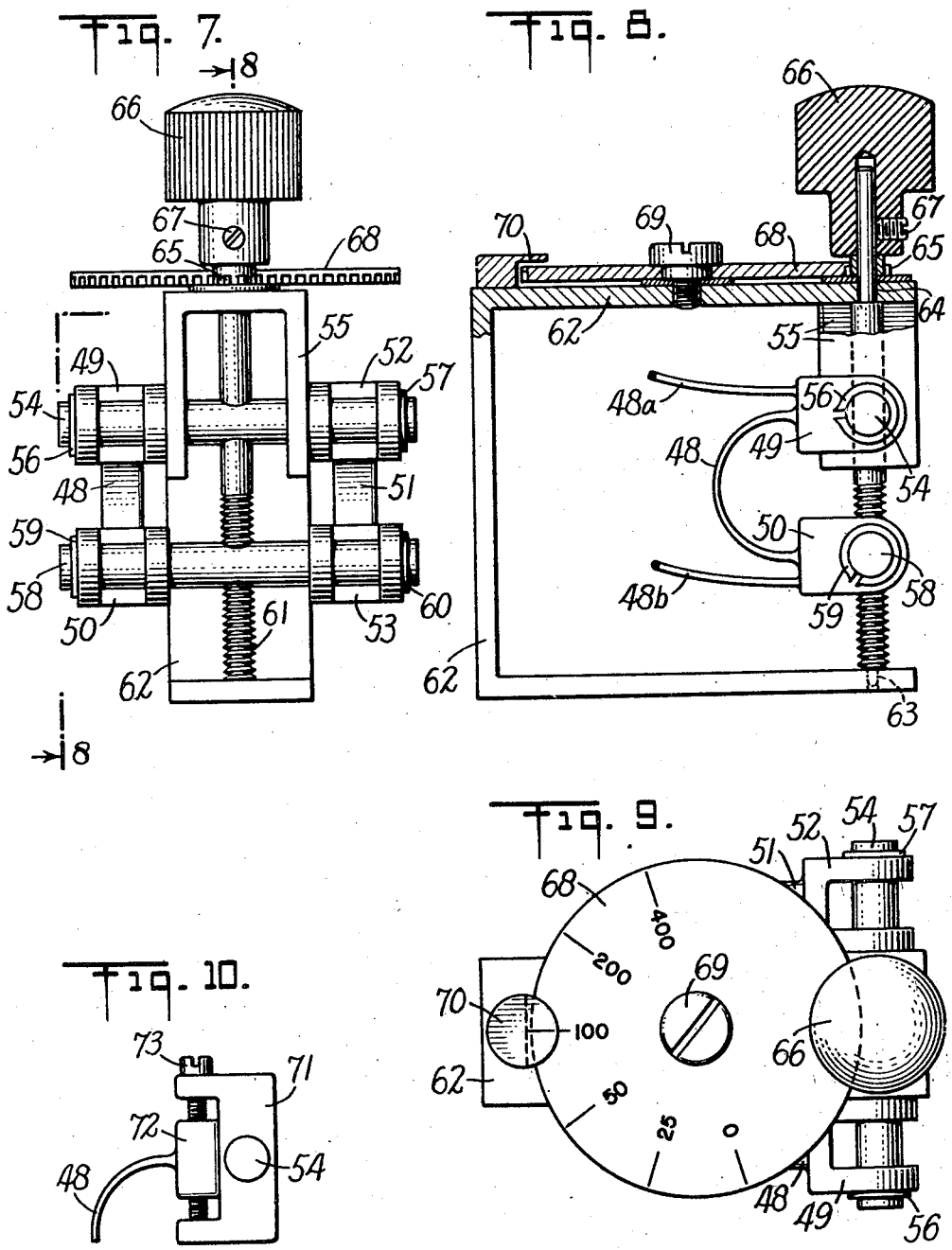
INVENTOR
Gerald I. Bilyeu
BY
Blair, Curtis + Hayward
ATTORNEYS Patented Dec. 9, 1947

2,432,082

UNITED STATES PATENT OFFICE 2,432,082

BOURDON TUBE VARIABLE RESISTANCE VALVE

Gerald I. Bilyeu, Foxboro, Mass., assignor to The Foxboro Company, Foxboro, Mass., a corporation of Massachusetts Application October 20, 1944, Serial No. 559,640

8 Claims. (Cl. 138—46)

This invention relates to apparatus for providing an adjustable restriction to the flow of fluid for automatic controllers, and more particularly to apparatus for providing accurate flow-restricting or flow-passing characteristics.

Needle valves have in the past been used as mechanism for providing small, adjustable flows of gas or liquid. But such valves have many disadvantages when used in automatic controllers, to wit: their stuffing glands are subject to leakage to atmosphere and when such leakage is disadvantageous, this problem is serious. Further, where it is desirable to have several flow-resisting mechanisms adjusted simultaneously to provide for flows having predetermined relationships, needle valves are unsatisfactory because of their calibration difficulties and for other mechanical reasons.

It is an object of the present invention to provide a flow restricting device which is not subject to the disadvantages above-mentioned, and which may be adjusted to provide accurate predetermined flow characteristics.

It is another object of the invention to provide an adjustable restrictive device capable of being used for many of the same applications as heretofore have been furnished with needle valves, but including characteristics and structural features rendering it superior in many conditions of operation and in ease of adjustment to needle valves.

These and other objects of the invention will be in part pointed out and will be in part obvious from the text.

The invention, accordingly, consists of the features of construction, combinations of elements, and arrangements of parts as will be exemplified in the structure to be hereinafter more fully described and the scope of the application of which will be set forth in the accompanying claims.

In the accompanying drawings, in which several embodiments of the invention are shown;

Figure 3 represents graphically fluid flow through the restrictor as plotted against increments of dial setting;

Figure 4 is an elevational view of a variable fluid restrictor embodying the invention;

Figure 5 is a side elevational view of the restrictor shown in Figure 4;

Figure 6 is a sectional view taken along the line 6—6 of Figure 4;

Figure 7 is a view of another embodiment of the invention showing how two restrictors may be combined in a dual capacity;

Figure 8 is a view taken along the irregular line 8—8 of Figure 7;

Figure 9 is an end elevation of the dual restrictor shown in Figures 7 and 8; and Figure 10 shows structure for effecting an adjustment in a dual restrictor of the type illustrated in Figures 7-9.

Figure 1:
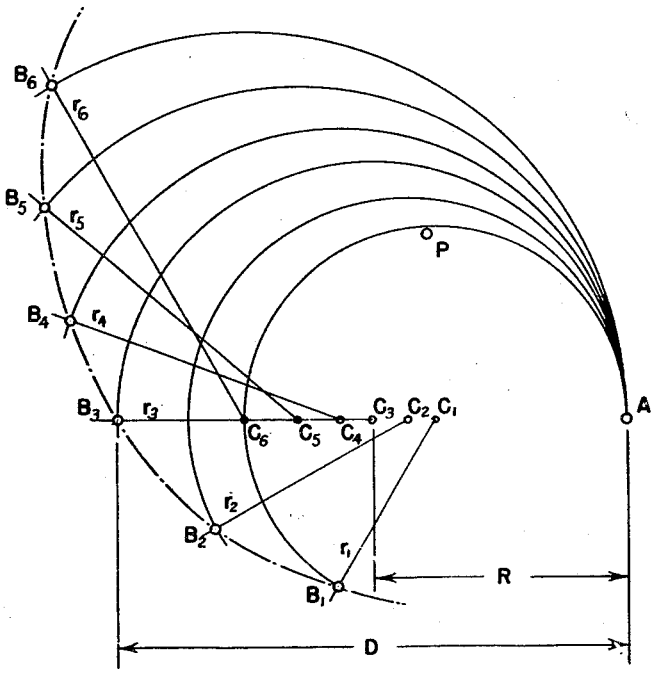
Figure 1 is a geometrical diagram to be used in the explanation of the invention.

The invention in its preferred form makes use of an arcuately shaped restrictor resembling a section cut from ordinary Bourdon tubing. Variations in the restricting effect upon fluid flow therethrough may be brought about by increasing or decreasing the radius of curvature of the section of tubing. Thus, decreasing the radius of curvature decreases the cross-sectional area of the passage through the tubing and vice versa. As the tubing is bent more and more the flow of fluid through it for a given pressure drop across the tubing may be very nearly reduced to zero. As the tubing is unbent, the same pressure drop will produce a relatively larger fluid flow because the resistance to fluid flow therethrough is substantially reduced.

It has been discovered that by bending such tubing in a certain manner a highly advantageous relationship of change of fluid flow to change of bending may be obtained. The use of such tubing to obtain variable flow of fluid therethrough when operated in said certain manner, as will be described, has many advantages. Not only may the fluid flow be easily adjusted and with precision, but also the calibration of the flow per degree of bending for a given tube remains constant under conditions that would interfere with the effective resistances which might be obtained by the use of needle valves.

The above-mentioned relationship that has been discovered between a change in the bending of the tube and the flow through it is one that gives an equal percentage change in the flow through the tubing for an equal increment of bending throughout the entire operative range of bending of the tube. Such a relationship has definite advantages in many industrial applications for it gives what might be termed a straight line relationship between change of restrictor setting to change of flow. This relationship may be conveniently illustrated by an example. Assume that the tube is bent in equal steps. Then as the degree of bending is changed from one step to another, the flow through the tubing is changed in equal percentage steps. Thus, if each step produces a flow variation of 10%, and at a certain step the flow is 10 units per minute, and the tube is unbent one step, then the flow will increase 10%, i. e., from 10 units per minute to 11 units per minute.

Such an equal percentage flow variation for equal steps of bending throughout a given range of flow variation, it was discovered, was obtained if the movable end of the tube restrictor was moved in such manner that the tube itself was bent so as to be maintained in a substantially curvate shape, such as the shape of a substantially true arc. Under such conditions equal movements of the free end of the tube along a path that would always keep the tube in such an arc produce equal percentage changes of flow through the tube.

In one embodiment of the invention such bending and unbending of the tube is obtained by rigidly fixing one end of the tube and causing the movable end of the tube to move along a path which very nearly approximates the path that it would follow if it were moving freely.

In Figure 1 there is graphically shown a procedure for approximating the path of the free end of an arcuately bent restrictor tube to obtain the relationship above described for a selected range of tube bending. The fixed end of the tube is located at point A. By construction, the radius of the arc of the tube when bent exactly into a semi-circle (i. e., when its free end B is at point $B_3$) has been taken as equal to the value $R$. The length of the 180° arc of the tube correspondingly is equal to $\pi R$ or $\frac{1}{2}\pi D$, where D is the diameter between the two ends of the tube when the tube subtends an arc of 180°.

The tube is now assumed to be bent into different circular curvatures. Thus it is first assumed to be bent so that its length, which remains unchanged, subtends 240° of arc, or $\frac{2}{3}$ of a circle. In this condition, the end B is at position $B_1$ and the radius $r_1$ of the arc of the tube has a value of $\frac{3}{4}R$. This is obtained as follows: the length of the arc of the tube is $\pi R$. Hence, the length of the tube bent to the 240° of arc is $\pi R$. The length is also $\frac{2}{3} \times 2\pi r_1$. Putting these equal to each other $r_1 = \frac{3}{4}R$. Using this same procedure, when the tube is bent to 210° of arc, or $\frac{7}{12}$ of a circle, so that its end B is at position $B_2$, its radius of curvature $r_2 = \frac{6}{7}R$; when bent to 180° of arc, or $\frac{1}{2}$ of a circle, its radius of curvature $r_3 = R$; when bent to 160° of arc, or $\frac{4}{9}$ of a circle, its radius of curvature $r_4 = \frac{9}{8}R$; when bent to 140° of arc, or $\frac{7}{18}$ of a circle, its radius of curvature $r_5 = \frac{9}{7}R$; and when bent to 120°, or $\frac{1}{3}$ of a circle, its radius of curvature $r_6 = \frac{3}{2}R$. The positions of the end B for the last three bending conditions are respectively $B_4$, $B_5$, $B_6$. The centers of the circles whose radii are $r_1$, $r_2$, $r_3$, etc. are indicated respectively at $C_1$, $C_2$, $C_3$, etc.

No arc of a circle can be drawn which will pass through all the points $B_1$ through $B_6$, but a center P can be located for the circle passing through points $B_1$, $B_2$, and $B_3$; or for a center for a circle passing through points $B_2$, $B_3$, and $B_4$, or for a center for a circle passing through points $B_3$, $B_4$, $B_5$, etc. Thus the movement of the free end of the tube may be so restricted by mechanical means that the movable end of the tube is caused to pass through points $B_1$, $B_2$, and $B_3$ as it moves. Or it may be so restricted in its movement as to pass through points $B_2$, $B_3$, $B_4$, etc. Thus, for a limited range of movement the movable end of the tube may be caused to traverse a path which approximates a portion of the true curve containing all the points B obained as above described. The closer points $B_1$, $B_2$, $B_3$, etc. are located together, the more accurate will be the approximation of the path of the movable end of the tube to the portion of the true curve.

The next step in the construction is to select the limited range of bending movement of the tube required to produce the flow variations desired. Such a selection depends upon such factors as the size of the tube and the range of flow variations that will be required. Having made such a selection, the center P about which the movable end of the tube is to be located is selected. If, for example, the limited movement is to be from points $B_1$ through $B_3$, the center P is located by the intersection of the two lines which respectively contain all the points equidistant from $B_1$ and $B_2$, and from $B_2$ and $B_3$. Or if the limited range of movement of the movable end of the tube were to pass through points $B_3$, $B_4$, and $B_5$ for example, then the center P about which the movable end of the tube is to pass is determined by intersection of the two lines which contain all the points equidistant from points $B_3$, and $B_4$, and from $B_4$ and $B_5$.

It is, therefore, apparent that the exact location of the center P is a matter of engineering judgment to obtain the desired uniform bending of the tube throughout a limited selected range of bending to obtain the desired equal percentage changes of flow for equal changes in the position of the movable end of the tube.

Figure 2:
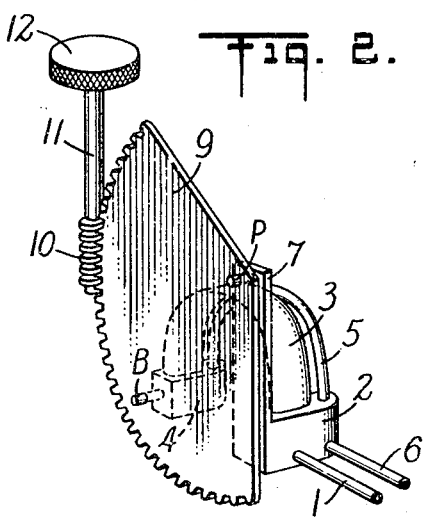
Figure 2 is a schematic perspective view of an embodiment of the invention.

Figure 2 shows a restrictor, the design of which is based upon the diagram of Figure 1. The restrictor includes a gear sector 9 rotatable about a fixed pivot P corresponding to center P selected as above described. Pivot P is formed by an arbor supported by a bracket 7 secured with respect to a base 2. Also secured to the base is one end of tube 3. The other end of tube 3 is attached to a block 4 pivotally secured to gear sector 9 at point B. In order to locate both the fluid inlet and outlet in base 2, a flexible return tube 5 having no flow restricting characteristics provides a return connection between block 4 and base 2. Fluid is supplied through an inlet pipe I and base 2 into tube 3. Inside of block 4 there is a passage connecting the free end of the tube with return tube 5 which, in turn, is connected at its other end to an outlet pipe 6 through base 2 to complete the circuit. Sector gear 9 pivots on arbor P and meshes with a worm 10 on a shaft 11 rotatable by a hand knob 12. Thus, by turning knob 12, the worm raises or lowers sector 9 and makes the free end of the tube follow approximately the same path which the free tube would inherently tend to follow if it were caused to unbend over the same range of movement.

Figure 3 illustrates graphically typical results that may be obtained with a variable restrictor tube constructed as described above. Fluid flow values as indicated are plotted against the values given on the dial. The equation of the curve illustrated in Figure 3 has the general form $y = ce^{-mx}$, where $y$ represents flow, $x$ represents dial setting, and $c$ and $m$ are constants which fit the equation to the plotted curve. The graph shows pictorially one striking characteristic of the restrictor; namely, that for a given increment of change in dial setting, no matter where it occurs on the scale, a corresponding percent change in fluid flow follows which is in proportion to the increment of change in dial setting. In other words, for a given change in dial setting a given change in percent of fluid flow results. This constant relationship throughout the range of the restrictor makes for easier and more rapid adjustment in the field.

Figures 4 and 5 show additional details of a restrictor mechanism. The fluid enters through a supply pipe 14 which is held pressuretight within a stationary support block 15 by means of a screw 16. It passes through block 15 and a base block 42 (to be described) and through unrestricted tubing 17 soldered at points 18 and 19 to base block 42 and a movable support block 20. The fluid then passes through block 20 by means of an opening 21 (see Figure 4) into a tube 22 which is also soldered, at points 23 and 24, into blocks 20 and 42. Thereafter it passes through block 15 again and out an outlet pipe 25 which is held pressuretight by a screw 26. A sector gear 27 is revolvable about a shoulder screw 28 mounted in a bracket 29. Block 20 is fastened to the sector gear by means of a pin 30. The gear and block are separated by a collar 31. Sector gear 27 is maintained in proper engagement with a worm 32 by means of spacing washers 33 and 34 (see Figure 4). Worm 32 is carried upon a shaft 35 which, in turn, is supported within bracket 29 and a mounting plate 36. To the end of shaft 35 is secured a dial 37 and a knob 38. A pointer 39 is secured to mounting plate 36 by means of a small screw 40. Rotation of knob 38 turns the worm which, in turn, rotates the sector gear to raise and lower support block 20 through the pin 30, thus flexing the tube and varying the resistance through the tube to the passage of fluid therethrough.

Figure 6 is a cross-sectional view taken along the line 6—6 of Figure 4 and shows the manner in which tube 22 is mounted upon support blocks 15 and 42. Tube 22 is soldered to base block 42 at point 24. This base block fits tightly into a groove 15a in support block 15, and a fluidtight gasket 45 is provided between the two blocks. The two blocks are held firmly together by means of screws 46 and 47. Outlet tube 25 is provided with a cone-shaped compression fitting 43 which is forced tightly against a seat 44 by screw 26, thus preventing leakage of fluid. Support block 15 is indicated as secured to mounting plate 36 by means of a screw 41.

Figures 7, 8, and 9 portray a dual model of two synchronized variable resistance tubes for the regulating of fluid flow. One application which suggests itself where such a dual restrictor might be useful is in connection with reset and derivative mechanisms of automatic control apparatus. One such apparatus is described and claimed in the copending application of Clesson E. Mason, Serial No. 385,493, filed March 27, 1941; another is in the application of George A. Philbrick, Serial No. 482,157, filed April 7, 1943. A resistance tube 48 is soldered into a base block 49 at one end and into an adjustable block 50 at the other end. Similarly, a resistance tube 51 is soldered into a base block 52 and an adjustable block 53. Fluid is led to block 49 through a flexible tube 48a and from adjustable block 50 through a flexible tube 48b. Fluid connections for blocks 52 and 53 have been omitted from the drawings in order to simplify the showing. Fluid is led into base blocks 49 and 52 separately, then through the resistance tubes, and then out through the adjustable blocks. This makes two separate circuits of variable flow resistance—for example, one for reset and the other for derivative functions for automatic control apparatus. Base blocks 49 and 52 are pivotally mounted on a bar 54 which is fastened to a bracket 55. They are rotatably held onto bar 54 by means of spring clips 56 and 57. Adjustable blocks 50 and 53 are pivotally mounted on bar 58 and are rotatably retained in place by spring clips 59 and 60. A shaft 61 is threaded toward its lower end, as viewed in Figures 7 and 8, and screws perpendicularly through bar 58 at its mid point. Shaft 61 is maintained in position within a frame 62 at its lower end by a bearing hole 63, and at its upper end by a bearing hole 64. It passes perpendicularly through a clearance hole in the mid point of bar 54. A small pinion 65 is fastened onto shaft 61 by a force fit, and a knob 66 is fastened onto the shaft by means of a set screw 67. Pinion 65 meshes with gear teeth on the periphery of a dial 68 which turns upon a shoulder screw 69 fastened to frame 62. An index 70 is securely fastened to frame 62. Thus, by turning knob 66, blocks 49 and 50 as well as blocks 52 and 53 are moved either nearer together or farther apart so as to compress or expand the resistance tubes and the pivotal mounting of blocks 49, 50, 52, and 53 assures that tubes 48 and 51 always maintain true arcs regardless of the adjustment. This action either slows down or speeds up the flow of fluid through the tubes, thereby controlling the fluid flow. Rotation of knob 66 turns pinion 65 and dial 68. The dial is graduated and calibrated to read in units of fluid flow.

In order to synchronize the flow through each of the tubes or to give them a predetermined ratio with respect to one another, a block 71 (see Figure 10) may be substituted for block 49 shown in Figure 7. The end of tube 48, shown in Figure 10, is fastened into a separate block 72 in which the inlet pipe is located. This block is raised and lowered by turning a micrometer screw 73 threaded within block 71. Thus, for a given dial setting and flow through the other tube, by adjusting micrometer screw 73, fluid flow through tube 48 may be synchronized or otherwise adjusted.

The Figures 2 and 3 construction may also be constructed so as to mount two or more restrictors to be adjusted in synchronism as described in connection with Figures 7–10. In this connection, several supports or segments 27 of Figure 2 may be provided, each to move the end of its restrictor. The segments may be made adjustable with respect to each other to set up the desired relation between the restrictors, and then driven synchronously by a manually turned hand knob 38.

Restrictors of the type described have several advantages over conventional needle valves. Particularly, however, they are not so subject to clogging and plugging because of dust and oil as are needle valves when set for small flows. Also, they maintain their calibration. Because of the extreme fineness and small clearance necessary in needle valves, where the entire restriction is focused at one point, the same flow does not always result from the same setting. But with a restrictor embodying the invention, flows may easily be adjusted to the desired values by turning a dial to the desired setting. The restrictors are easily and economically made from appropriate lengths of conventional Bourdon tubing.

As many possible embodiments may be made of the above invention and as changes may be made in the embodiments described without departing from the scope thereof, it is to be understood that all matter herein set forth or shown in

I claim:

1. In fluid operated apparatus of the character described, the combination including: an arcuately bent restrictor of Bourdon tubing or the like, and means for adjustably alterting the radius of curvature of the restrictor independently of the fluid pressure therein, to change the internal cross-section of the restrictor and hence its resistance to passage of fluid therethrough; said apparatus being characterized by the fact that said means holds one end of the restrictor rigid and moves the other end along substantially the same path that said end would follow if free to bend and unbend.

2. In fluid operated apparatus of the character described, the combination including: an arcuately bent, Bourdon-like section of tubing open to fluid flow at each end, an arbor-mounted supporting member, means for rotating said member, one end of said section of tubing being fixed, the other end of said section of tubing being movable and secured to said member, and the arbor supporting said member being located at a point P, which point is the center of a circle passing through three adjacent positions that the movable end of said tubing would occupy if caused to bend and unbend while free from said member.

3. In fluid operated apparatus of the character described, the combination including: an arcuately bent restrictor of Bourdon tubing or the like, an end support for each end of the restrictor, and a motion imparting mechanism for positively moving one end support through a predetermined path with respect to the other end support; said predetermined path being the path that the one end of the tubing would inherently tend to follow with respect to the other end if the one end were wholly unrestricted in movement and were moved only by changes of pressure from within.

4. The combination of claim 3 wherein the mechanism includes: pivotal mountings for each end support, whereby the ends of the restrictor are free to rotate upon the pivotal mountings during relative movement thereof so that the restrictor may maintain its inherent curvate configuration.

5. The combination of claim 3 wherein the mechanism includes: an arbor fixed with respect to said other end, and an arm pivotally carried upon the arbor; said one end of the restrictor being pivotally carried upon the arm for movement through an arc centered at the arbor.

6. In fluid operated apparatus of the character described a plurality of arcuately bent restrictors of Bourdon tubing or the like, an end support for each end of each restrictor, a motion imparting mechanism for each restrictor for positively moving one end support thereof through a predetermined path with respect to the other end support thereof, and a coupling between the mechanisms of two adjacent restrictors for synchronizing the relative movements thereof.

7. A fluid operated apparatus of the character described for imposing an infinitely variable quantity of resistance to fluid flow into a fluid circuit including: an arcuately bent restrictor of Bourdon tubing or the like through which a regulated amount of fluid is to pass, a fixed fluid connection block fixedly carrying one end of the retrictor, a movable fluid connection block movably carrying the other end of the restrictor, an adjustable finger piece and cooperating visible scale for making manual adjustments to the apparatus, a pivotally mounted lever rotatable about an axis fixed with respect to the fixed connection block, the movable connection block being carried upon the pivotally mounted lever, mechanism for transferring finger piece adjustments to the pivotally mounted lever to adjust the position of the movable connection block with respect to the fixed connection block, and the axis for the pivotally mounted lever being at a point substantially equidistant from three positions which would be assumed inherently by the movable connection block if the restrictor were unrestrained in movement and were moved only by changes in pressure from within.

8. In fluid operated apparatus of the character described, the combination including: a plurality of arcuately bent restrictors of Bourdon tubing or the like, an end support for each end of each restrictor, motion imparting mechanisms for positively moving one end support of each restrictor through a predetermined path with respect to its other end support, said predetermined path being in each instance the path that the one end of the restrictor would inherently tend to follow if the one end were wholly unrestrained in movement and were moved only by changes in pressure from within, and said mechanisms including adjustment structure for selectively adjusting the radius of curvature of one restrictor with respect to the radius of curvature of another, whereby fluid flow through said one restrictor may be individually regulated with respect to fluid flow through said other.

GERALD I. BILYEU

REFERENCES CITED

The following references are of record in the file of this patent:

UNITED STATES PATENTS

| Number | Name | Date |
| --- | --- | --- |
| 2,170,557 | Guarnaschelli | Aug. 22, 1939 |
| 2,177,128 | Johnson | Oct. 24, 1939 |